US005991264A

United States Patent [19]
Croslin

[11] Patent Number: 5,991,264
[45] Date of Patent: *Nov. 23, 1999

[54] METHOD AND APPARATUS FOR ISOLATING NETWORK FAILURES BY APPLYING ALARMS TO FAILURE SPANS

[75] Inventor: William D. Croslin, Colorado Springs, Colo.

[73] Assignee: MCI Communications Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/753,559

[22] Filed: Nov. 26, 1996

[51] Int. Cl.$^6$ .................................................. H04J 3/13
[52] U.S. Cl. ........................ 370/225; 709/224; 709/239; 370/248
[58] Field of Search ..................... 370/225, 227, 370/248; 395/182.02, 185.02; 340/827; 709/224, 239

[56] References Cited

U.S. PATENT DOCUMENTS

| | | |
|---|---|---|
| 4,577,066 | 3/1986 | Bimonte et al. . |
| 4,825,206 | 4/1989 | Brice ....................................... 340/827 |

(List continued on next page.)

FOREIGN PATENT DOCUMENTS

| | | |
|---|---|---|
| 0 494 513 A2 | 12/1991 | European Pat. Off. . |
| WO 95/10149 | 4/1995 | WIPO . |

OTHER PUBLICATIONS

Herzberg et al. "The Hop–Limit Approach for Spare–Capacity Assignment in Survivable Networks" IEEE Dec. 3, 1995.

Dighe, et al. "A Link Based Alternative Routing Scheme for Network Restoration under Failure" IEEE May 1995.

Grover et al. "Near Optimal Spare Capacity Planning in a Mesh Restorable Network" IEEE Jan. 1991.

Hasegawa et al. "Dynamic Reconfiguration of Digital Cross– Connect Systems with Network Control and Management" IEEE.

Bellary et al. "Intelligent Transport Network Survivability: Study of Distributed and Centralized Control Techniques" IEEE 1990.

Shimazaki et al. "Neopilot: An Integrated ISDN Fault Management System" IEEE Feb. 1990.

Shimazake et al. "Network Fault Management" Sep. 1992.

Newport, et al. "Network Survivability Through Connectivity Optimization " IEEE 1987.

Flanagan et al. "Principles and Technologies for Planning Survivability–A Metropolitan Case Study", IEEE 1989.

(List continued on next page.)

Primary Examiner—Brian Zimmerman

[57] ABSTRACT

A method and apparatus for analyzing a telecommunications network and isolating failures within the network first receives alarms from various nodes in the network as a result of a failure. The method selects one alarm and then retrieves topology data associated with a trunk that caused the selected alarm to be generated. The method collects all alarms from the nodes traversed by the selected trunk and applies the collected alarms to the retrieved topology. The method identifies or retrieves information corresponding to maximum failure spans that can be restored with a single restoration route (failure spans) for the selected trunk. Thereafter, the method applies the selected alarms to the corresponding failure spans to identify the single failure span containing the failure to thereby isolate the failure. By isolating a failure to within a failure span, the present invention locates a failure with precision sufficient for determining an optimal restoral route, but minimized within a sufficient range of spans in the network so that processing time for isolating the failure is minimized. As a result, the identified failure span represents the isolation of the failure, and is the most granular isolation of a failure useful for restoring traffic impacted by the failure.

27 Claims, 4 Drawing Sheets

U.S. PATENT DOCUMENTS

| | | | |
|---|---|---|---|
| 4,884,263 | 11/1989 | Suzuki | 370/225 |
| 4,920,529 | 3/1990 | Sasaki et al. | |
| 5,187,740 | 2/1993 | Swaim et al. | 379/209 |
| 5,335,268 | 8/1994 | Kelly, Jr. et al. | 379/112 |
| 5,435,003 | 7/1995 | Chng | 395/182.02 |
| 5,459,716 | 10/1995 | Fahim et al. | |
| 5,463,615 | 10/1995 | Steinhorn | |
| 5,537,532 | 7/1996 | Chng | 395/182.02 |
| 5,586,112 | 12/1996 | Tabata | 370/225 |
| 5,636,203 | 6/1997 | Shah | 370/244 |
| 5,646,936 | 7/1997 | Shah et al. | 370/228 |
| 5,706,422 | 1/1998 | Maruyama | 395/182.02 |

OTHER PUBLICATIONS

M. Wehr "Protection of Synchronous Transmission Networks", Commutation and Transmission, No. 4, 1993.

Coan, et al. "Using Distributed Topology Update and Preplanned Configurations to Achieve Trunk Network Survivability" IEEE Oct. 1991.

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994

METHOD AND APPARATUS FOR ISOLATING NETWORK FAILURES BY APPLYING ALARMS TO FAILURE SPANS

TECHNICAL FIELD

The present invention relates to restoring communication systems after a network suffers from an unplanned outage or break in a signal path.

BACKGROUND OF THE INVENTION

In the telecommunications field, particularly in long distance networks, long distance network providers continually strive to increase the traffic carrying capability of their transmission medium. For example, since fiber optic cables have increased bandwidth over known twisted pair or copper wire cables, fiber optic cables are used increasingly for connecting network stations and other network elements. As a result, a greater number of stations or network elements can be connected over a fewer number of fiber optic cables, as opposed to prior cables. In other words, each fiber optic cable can handle numerous trunks, as opposed to prior cables.

Unfortunately, if one or more of the fiber optic cables fail, massive disruption of services to a large number of network customers and users can result. Network service providers or telecommunications carriers therefore strive to quickly and economically restore traffic effected by these disruptions or "outages." Restoring network outages generally requires four steps: (1) detecting the network failure, (2) isolating the location of the failure in the network, (3) determining a traffic restoral route, and (4) implementing the restoral route. Network restoration must be executed quickly to ensure minimal interruption of network traffic. Therefore, nearly all telecommunications carriers wish to restore traffic within a few seconds or less. The telecommunications carriers typically restore the highest priority network elements first, and as many of such elements as possible within a short period of time.

Currently, telecommunications carriers simulate possible failures and determine restoral routes to develop a "pre-plan" by collecting large amounts of data reflecting the logical topology of the network. The collected data is often retrieved from network engineering databases which reflect the logical construction of the network, such as indicating the connections and paths of all network traffic trunks. An engineer or network analyst analyses the collected data, compares the collected data to the geographic or physical layout location of the network, and then generates the pre-plans therefrom. Since the pre-plans are developed prior to any failure in the network, when a failure does occur, a plan already exists for restoring traffic affected by the failure. In general, a pre-plan corresponds to a segment of the network that can incur a failure. If that segment fails, then the corresponding pre-plan is retrieved, and its restoral route implemented.

To determine where in the network a failure has occurred, a central location often receives various alarms from the network, which are generated in response to the failure. Numerous algorithms are performed by a central computer to apply or correlate the various alarms to each corresponding trunk in the trunk topology. The computer or analyst must then match the alarms to a physical network topology to isolate the location of the failure within the network, typically within a segment of a trunk between two nodes. In sum, existing methods of isolating a network failure include the steps of: (1) receiving numerous alarms from nodes throughout the network; (2) collecting logical topology data for each trunk generating each alarm; (3) applying each received alarm to the logical topology data for each trunk; (4) determining a failed span for each failed trunk, where the failed span can be larger or smaller than the actual physical span of the trunk, depending on the nodes on which the trunk is patched or routed: and (5) combining all determined failed spans and correlating the spans to determine a physical location or span of the failures.

Each node traversed by a failed trunk produces an alarm. Often, multiple trunks fail as a given optic cable fails. Since each trunk in the network typically traverses multiple nodes, the network typically produces numerous alarms from multiple nodes as a result of a failure. Each alarm must be correlated with the logical trunk topology to isolate the failure of a given trunk to a segment between two of the multiple nodes that issued alarms. This is the maximum granularity with which the failure can be isolated. Extensive processing, and thus time, is required to isolate a failure in the network because of the numerous alarms, trunks and nodes in a network. The processing and time also increase as the size of telecommunications networks increases. As noted above, telecommunications carriers wish to restore traffic within a few seconds or less, and thus such delays required to isolate a failure are undesirable. Additionally, if only a few trunks fail, the network may provide an insufficient number of alarms from which to isolate the actual physical span in which the failure occurs.

After isolating the failure, the analyst can then identify the appropriate pre-plan. For example, by isolating the failure on a physical map of the network, the analyst can then identify an alternative route that restores all failed traffic, without sacrificing other traffic or creating new outages. Isolating a failure within the network requires extensive processing, particularly with large networks. Again, such extensive processing necessarily requires processing time, and therefore increases the delay in restoring the network following the failure.

SUMMARY OF THE INVENTION

The present invention enhances network restoration processes by providing an automated method of locating or isolating failures in a network by preferably isolating failures with respect to maximum network spans that can be restored with a single restoration route (i.e., failure spans) rather than with respect to segments of multiple failed trunks. As a result, the present invention isolates the failure within the network with precision that is sufficient for determining an optimal restoral route, but is minimized within this range so that processing time is also minimized. In sum, the specific precision with which the present invention isolates failures in the network optimally minimizes the processing time to locate the failure while still determining an optimal restoral route. Consequently, the present invention does not isolate a failure at a level of granularity that is greater than the level of granularity needed to determine the restoral route.

As noted above, prior methods of isolating failures require applying all alarms received from the network to each trunk correlating the trunks that cause the alarms to be issued with respect to specific segments of the trunks, and then employing these correlations to isolate the point of failure to the two nodes adjacent to the failure. The present invention, in contrast, preferably receives various alarms from the network, retrieves trunk topology data representing the network, matches the alarms to a single trunk, and then identifies the failure span for that trunk. The identified failure span represents the isolation of the failure, and is actually the most granular isolation of a failure that is useful for restoring traffic, rather than a specific segment between two nodes. Any additional processing to further isolate the failure between two nodes would not cause an improvement in restoring traffic, but would require additional processing time.

The present invention embodies a method and apparatus for analyzing a telecommunications network and isolating failures within the network. The invention preferably first receives alarms from various nodes in the network as a result of a failure. The invention preferably selects one alarm and then retrieves topology data associated with a trunk that caused the selected alarm to be generated. The invention collects all alarms from the nodes traversed by the selected trunk and applies the collected alarms to the retrieved topology to determine directions of the alarms. The invention then preferably identifies or retrieves information corresponding to maximum failure spans that can be restored with a single restoration route (failure spans) for the selected trunk. Thereafter, the invention applies the selected alarms to the corresponding failure spans so isolate the single failure span containing the failure. By locating a failure to within a failure span, the present invention isolates a failure with precision sufficient for determining an optimal restoral route, but minimized within a sufficient range of network spans so that processing time for isolating the failure is minimized.

The present invention embodies a method of isolating a failure within a network, where the network has a plurality of communication paths coupling a plurality of nodes. Each path has one or more channels traversing two or more nodes, and where the failure causes a plurality of alarms to be issued. The method includes the steps of: (a) selecting a group of alarms from the plurality of alarms, the group of alarms corresponding to a selected channel impacted by the failure, the selected channel traversing selected nodes of the plurality of nodes; (b) identifying one or more maximum restoration spans for failures along one or more communication paths between the selected nodes traversed by the selected channel; and (c) identifying a failed restoration span containing the failure based on a correlation of the restoration spans with the set of alarms.

The present invention also embodies an apparatus for isolating a failure within the network. The apparatus includes a storage device and a computer system. The storage device has stored therein network data for a selected channel impacted by the failure, the network data corresponding to selected nodes traversed by the selected channel. The computer system is coupled to the storage device and coupled to receive the plurality of alarms. The computer system: (a) selects a group of alarms from the plurality of alarms, the group of alarms corresponding to the selected channel, (b) identifies one or more maximum restoration spans for failure along one or more communication paths between the selected nodes traversed by the selected channel, and (c) identifies a failed restoration span containing the failure based on a correlation of the restoration spans with the set of alarms.

DETAILED DESCRIPTION OF THE INVENTION

A telecommunications network, and in particular a method and apparatus for analyzing the network, is described in detail herein. In the following, description, numerous specific details are set forth such as ordering and execution of steps under an analysis routine, certain steps for analyzing portions of a network, etc., in order to provide a thorough understanding of the present invention. One skilled in the relevant art, however, will readily recognize that the present invention can be practiced without the use of the specific details described herein, or with other specific steps in a routine, etc. Well-known structures and steps are not shown or described in detail in order to avoid obscuring the present invention.

Figure 1:
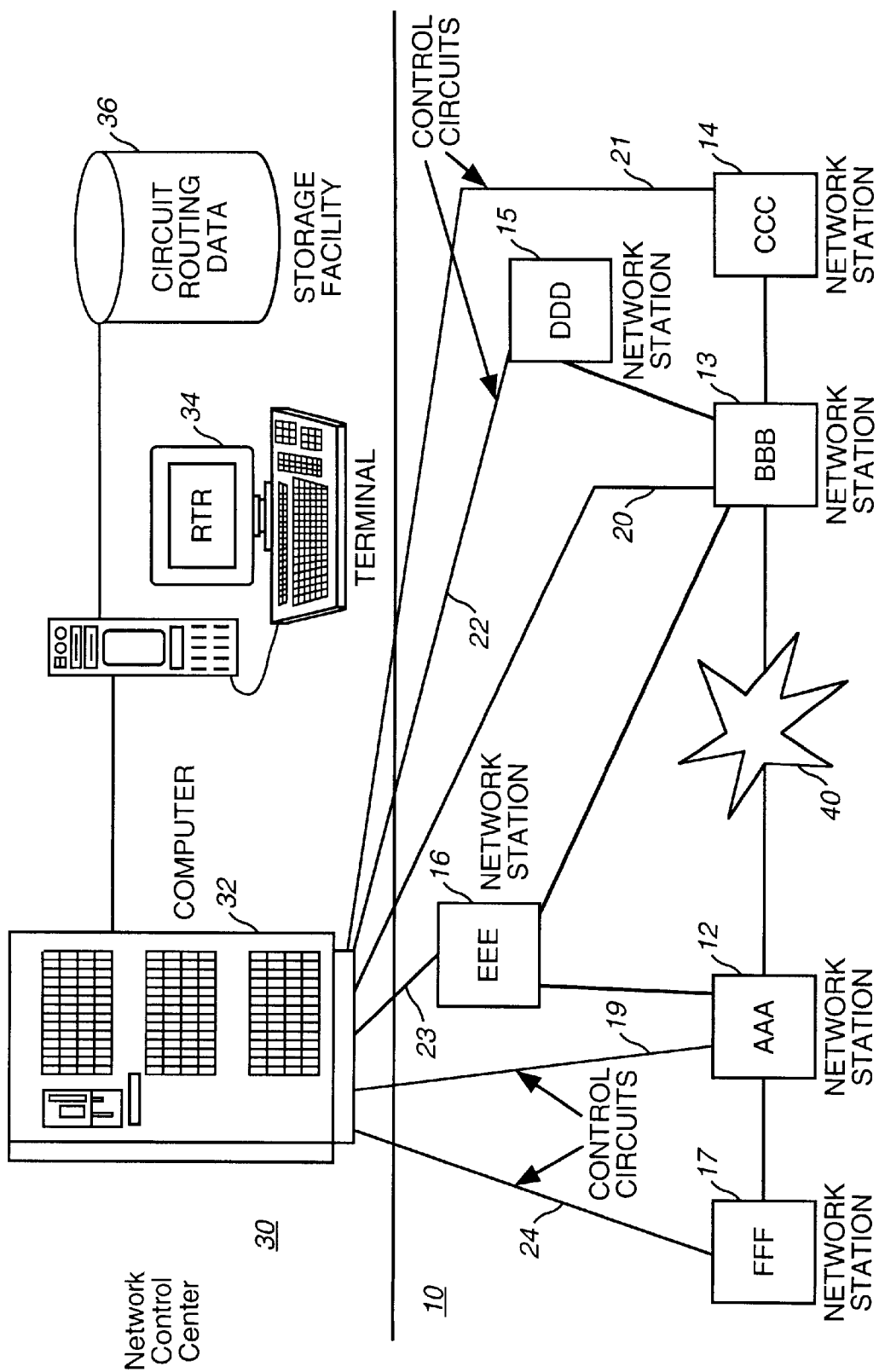
FIG. 1 is a block diagram of a portion of a network, including a network control center.

Referring to FIG. 1, a simplified telecommunication system is shown to help understand the present invention. As shown in FIG. 1, a telecommunications network 10 includes interconnected network stations or nodes AAA, BBB, CCC, DDD, EEE, and FFF, designated as stations 12–17, respectively. A "node" as used generally herein, refers to a physical link in a network, representing a terminal or system which may serve any of a number of functions. For example, each node can include digital cross connect (DXC) systems, multiplexing equipment, line termination equipment, and/or fiber transmission systems. A DXC system is a complex digital switch capable of automatically switching trunks based on external commands. A "trunk," as generally used herein, is a logical channel of communications capacity that traverses one or more nodes and one or more links between nodes (e.g., DS-0, DS-1, DS-3, etc.). Line termination equipment and fiber transmission systems typically include light-to-electricity transducers and/or multiplexers, as is known in the art.

Under normal conditions, communications traffic is routed between the network nodes 12–17 along trunks, and between these and other network nodes of the larger network 10 of which the portion shown in FIG. 1 forms a part thereof. Each node typically has a unique address or designator in the network 10. In addition, each node 12–17 is connected by control circuits 19–24, respectively, to a network management or control center 30. The control circuits 19–24 may each be an X.25 circuit, which is a known circuit for carrying control communications between the associated node and the network control center 30.

The network control center 30 includes a computer 32 and a terminal 34 for interacting with the computer 32, which provides an interface for human interaction. The network control center 30 also includes a storage facility 36 for storing network and circuit routing data, topology data, pre-plans, etc. Several of such network control centers 30 can be distributed throughout the network 10.

When an outage or disruption of telecommunications traffic occurs, such as the failure 40, the nodes 12–17 that couple to trunks or circuits impacted by the disruption recognize the disruption. In response to the recognized disruption, two or more of the nodes 12–17 generate alarms that are sent over the control circuits 19–24 to the network control system 30. As described below, the network control system 30 determines the location of the outage from these alarms.

Under the present invention, the computer 32 retrieves from the storage facility or device 36 information about the impacted circuits including the paths that they follow and the equipment they pass through at different nodes along the paths. Based on this data, the network control system 30, or a network analyst, can implement a pre-plan and/or restore telecommunications traffic on the network despite the outage.

The network control center 30 or the analyst implements the alternative routes in the network 10 by establishing new connections via commands transmitted through the control circuits 19–24, or alternatively, depending upon the equipment employed at the nodes 12–17, by other means of transmission to effect or direct manual actions to be taken at the nodes. For example, spare high bandwidth DS-3 trunks typically exist throughout the network 10, which can be employed to restore an outage in the network. The network 10 is quite effectively restored when the nodes 12–17 employ DXC systems that can automatically switch from one trunk to another based on commands from the network control center 30.

Figure 2:
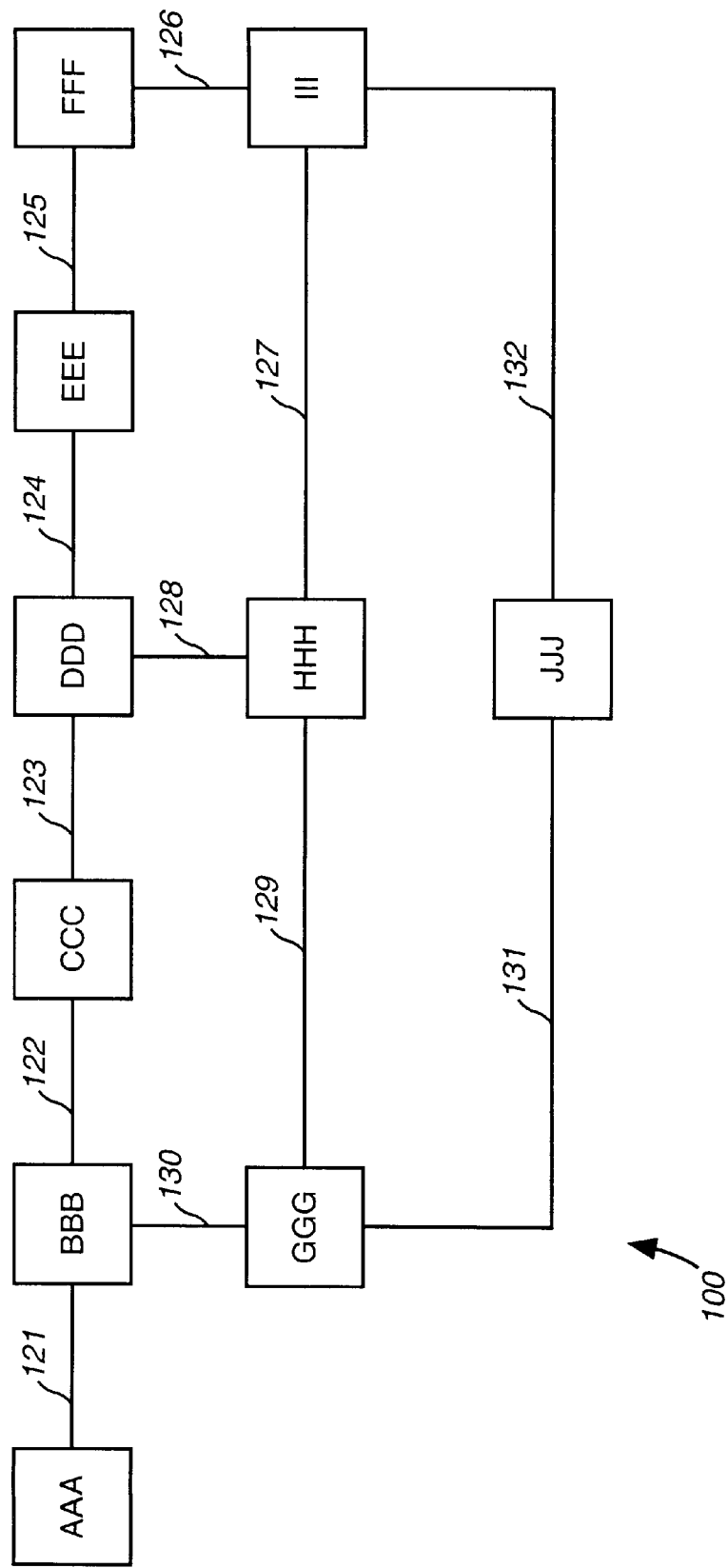
FIG. 2 is a block diagram of the physical topology of a first alternative portion of the network of FIG. 1.

Referring to FIG. 2, an exemplary network portion 100 of the network 10 is shown as having nodes designated as AAA, BBB, CCC, DDD, EEE, FFF, GGG, HHH, III, and JJJ. The nodes AAA and BBB are coupled by a link 121, the nodes BBB and CCC coupled by a link 122, the nodes CCC and DDD coupled by a link 123, the nodes DDD and EEE coupled by a link 124, the nodes EEE and FFF coupled by a link 125, the nodes FFF and III coupled by a link 126, the nodes III and HHH coupled by a link 127, the nodes HHH and DDD coupled by a link 128, the nodes HHH and GGG coupled by a link 129, the nodes GGG and BBB coupled by a link 130, the nodes GGG and JJJ coupled by a link 131, and the nodes JJJ and III coupled by a link 132. A "link," as generally used herein, is a physical connection between two nodes, representing any type and any capacity of communications between the nodes, such as one or more DS-3 trunks. A single network usually consists of multiple trunks, and a single trunk consists of one or more links that span multiple nodes. In general, most high capacity networks contain far more trunks than links. The links 121–132, and other links described herein, consist of any type and capacity of traffic trunks, such as optical fiber, microwave transmission, etc.

The nodes CCC, EEE, FFF, and JJJ of the network portion 100 of FIG. 2 are simply pass-through nodes. As generally used herein, a "pass-through node" is a node with only two links for which all trunks entering the node leave the node on another link, so that no switching or terminating of traffic occurs. In other words, the number of trunks entering the node equals the number of trunks leaving the node; there are no terminating or diverging trunks at that node, as is described more fully below. A pass-through node can include a digital repeater or generator. Pass-through nodes are important for identifying failures under the present invention because if a failure occurs, for example, between nodes BBB and DDD, then only a single restoration plan or pre-plan is needed for the links 122–123 between nodes BBB and DDD, as described below.

The nodes BBB, DDD, III, HHH, and GGG in the network portion 100 represent more significant functions in the network 10. For example, traffic entering the node BBB on the link 121 has two distinct links 122 and 130 on which the traffic may leave the node. Similarly, traffic entering the node DDD on the link 123 can leave the node on one of two links 124 or 128. Within the nodes BBB, DDD, III, HHH and GGG, various functions, such as cross-connecting and multiplexing, can occur that determine which link certain incoming traffic takes out of the given node. Importantly, the traffic entering the nodes BBB, DDD, III, HHH and GGG is not necessarily equal to the traffic leaving that node on any other link.

Figure 3:
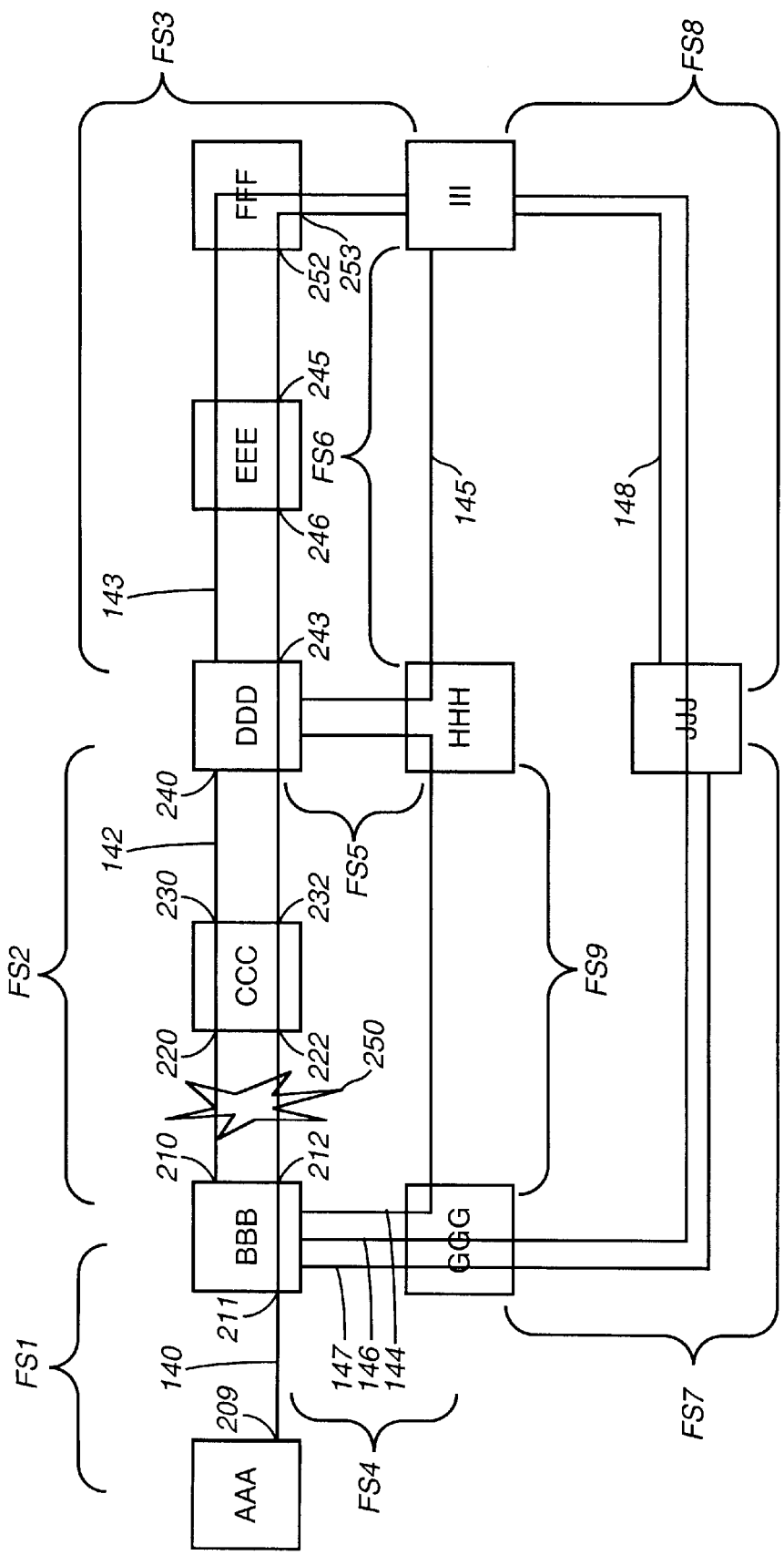
FIG. 3 is a block diagram of the logical topology of the first alternative portion of the network of FIG. 2.

Referring to FIG. 3, the logical topology of the portion 100 of the network 10 is shown. Specifically, FIG. 3 shows trunks 140, 142, 143, 144, 145, 146, 147, and 148 that traverse nodes AAA-JJJ as shown in FIG. 3. Table 1 below summarizes the inter-node connections of the eight trunks 140–148.

| Trunk No. | Nodes Traversed by Trunk |
| --- | --- |
| 140 | AAA - BBB - CCC - DDD - EEE - FFF - III |
| 142 | BBB - CCC - DDD |
| 143 | DDD - EEE - FFF - III |
| 144 | BBB - GGG - HHH - DDD |
| 145 | DDD - HHH - III |
| 146 | BBB - GGG - JJJ - III |
| 147 | BBB - GGG - JJJ |
| 148 | III - JJJ |

As shown by comparing FIG. 2 with FIG. 3, the link 121 includes only a single segment of the single trunk 140, while the link 122 includes a single segment from each of the trunks 140 and 142. The link 130 includes a segment from each of the three trunks 144, 146, and 147. A "segment," as generally used herein, is a single portion of a trunk that spans between two adjacent nodes, or in other words, is a single link of a single trunk.

As shown in FIG. 3, the portion 100 of the network 10 includes diverging and terminating trunks. "Diverging trunks" are trunks that enter a node and are demultiplexed and switched (e.g., via an M13 multiplexer and a DXC system) within the node so that the traffic may leave the node on a different trunk. For example, the trunks 144 and 145 entering the node HHH from the node DDD diverge, with the trunk 144 being routed to the node GGG, while the trunk 145 is routed to the node III.

A "terminating trunk" is a trunk that leaves a node but does not go to another node. In sum, the trunk terminates at that node, and represents traffic leaving the network 10. For example, the trunk 140 terminates at the nodes AAA and III, and thus the nodes AAA and III are end nodes for the trunk 140. A non-terminating trunk refers to a trunk that leaves a node and reaches another node without terminating. Either diverging or terminating trunks at a given node indicate that that node will be an end node of a failure span, and distinguishes that node from a pass-through node.

Rather than analyzing each trunk or segments of each trunk within the network 10 to isolate failures, the present invention analyzes failure spans consisting of links within the network. As generally used herein, a "failure span" is a span of the physical topology of the network, consisting of one or more links, having a singular point of failure in which all traffic carried by the span may be restored by a single plan. A failure span is a maximum length of the network 10 (in terms of nodes and links) that can be singularly restored.

The present invention preferably employs physical topology data that represents the maximum failure spans of a network, such as the failure spans generated by the inventor's copending U.S. patent application "Method and Apparatus for Determining Maximum Network Failure Spans for Restoration," filed concurrently herewith, and incorporated by reference herein. The maximum failure spans more closely reflect the physical topology shown in FIG. 2, as well as the counts of terminating and diverging trunks at each node as shown in FIG. 3. The physical topology does not change frequently in a typical telecommunications network. Only on such occurrences as when a new fiber optic cable is laid or other physical connection paths added or changed does the physical topology change. As described in the above application, failure spans are preferably calculated regularly, such as once a day, to virtually guarantee that the stored physical topology of failure spans is accurate.

The portion 100 of the network 10 has nine failure spans FS1 through FS9 as shown in FIG. 3. Table 2 below summarizes the nine failure spans FS1 through FS9 and their inter-node spans.

| Failure Span | Nodes Traversed by Failure Span |
|---|---|
| FS1 | AAA - BBB |
| FS2 | BBB - CCC - DDD |
| FS3 | DDD - EEE - FFF - III |
| FS4 | BBB - GGG |
| FS5 | DDD - HHH |
| FS6 | HHH - III |
| FS7 | GGG - JJJ |
| FS8 | JJJ - III |
| FS9 | GGG - HHH |

For example, the failure span FS3, having two trunks 140 and 143 and links 124–126, can be treated as a single route needing restoration if a failure occurs anywhere along this span. While prior art systems may designate a failure span between each of the nodes DDD, EEE, FFF and III, this is not as efficient because it will introduce more failure spans in the network, and thus require more processing time, restoration plans, etc. Such prior systems thus require greater granularity in isolating a failure in the network 10, as discussed herein. Any failure occurring on, for example, the span between the nodes DDD and EEE can be restored by the entire failure span FS3. As a result, the maximum granularity for which failure isolation must occur in this span is between nodes DDD and nodes III. The failure span FS3 cannot be extended any further than the nodes DDD and III, because beyond these two nodes. the traffic diverges (node III) or terminates (node DDD).

Each trunk that traverses a node enters that node on one port and leaves the node on another port. For example, the trunk 142 enters the node CCC on a port 220 and leaves the node CCC on a port 230. Use of the terms "enters" and "leaves" is arbitrary; the directionality of trunks within the network 10 is irrelevant. Each trunk that terminates at a node enters that node on a specific port. For example, the trunk 142 terminates at the node BBB at a port 210.

When a failure occurs in the network 10, each trunk that is impacted by the failure will cause nodes coupled to that trunk to generate alarms. Only those ports that are positioned towards or "face" the point of failure will generate an alarm. For example, if a failure 250 occurs on the link 122 between the nodes BBB and CCC, both of the trunks 140 and 142 will be impacted. The trunk 142 will cause the ports 210, 220, and 240 of the nodes BBB, CCC, and DDD, respectively, to generate alarms, since these ports face the failure 250. The port 230, however, of the node CCC will not generate an alarm since it faces "away" from the failure 250. Likewise, the trunk 140 will cause ports 209, 212, 222, 242, 246, 252 and 254 of the nodes AAA, BBB, CCC, DDD, EEE, FFF and III, respectively, to generate alarms, but ports 211, 232, 243, 248 and 253 of the nodes BBB, CCC, DDD, EEE and FFF, respectively, will not generate alarms. Such a configuration of ports and alarms issuing from corresponding nodes is conventional in telecommunications networks.

Figure 4:
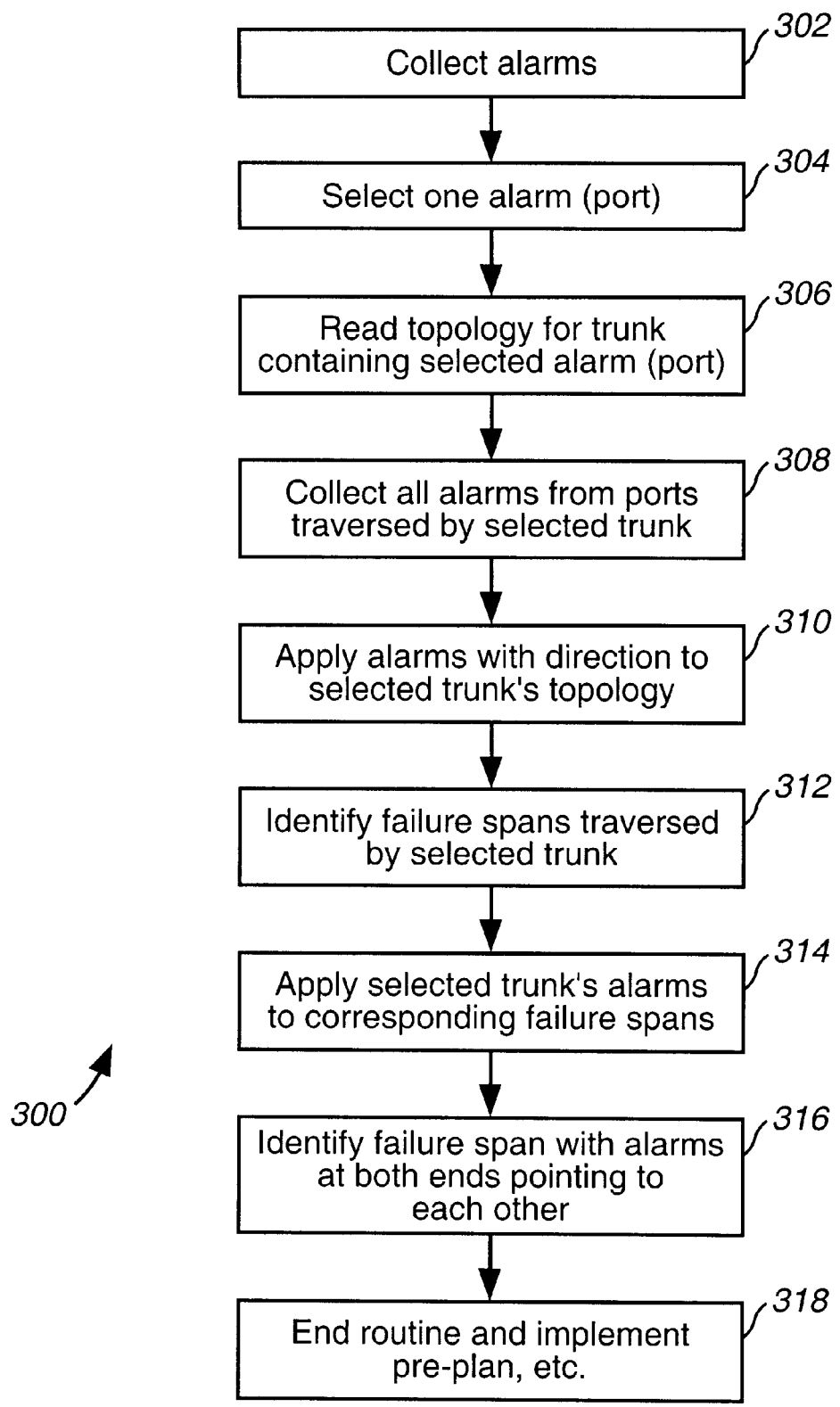
FIG. 4 is an exemplary flowchart diagram of a method for isolating network failures under the present invention.

Referring to FIG. 4, a routine 300 performed by the computer 32 in the network control center 30 isolates failures within the network 10. The routine 300 can be performed on any type of computer. Beginning in step 302, the computer 32 receives or collects alarm signals from two or more nodes in the network 10. As noted above a failure in the network 10 will typically impact several trunks. Therefore, each node through which the trunks are routed could issue multiple alarms, such as the nodes BBB, CCC, and DDD that issue alarms in response to the failure 250, which impacts the trunks 140 and 142.

In step 304, the computer 32 selects one of the received alarms. Each alarm is generated by equipment in the nodes, and each alarm is unique to, or specifies, a given port at that node. For example, the computer 32 can select the alarm issued by the port 222. The trunk 140 is routed through the port 222. The trunk 140 thus becomes the selected trunk. Under the present invention, the computer 32 is usually capable of receiving alarms from many different nodes in the network 10. In one embodiment, the alarms are of the type that help indicate the direction toward the point of the failure in the network, either alone or in conjunction with other data.

In step 306, the computer 32 retrieves the logical topology data for the trunk associated with the alarm selected in step 304. The computer 32 retrieves the logical topology data for that selected trunk from the storage facility 36. The retrieved logical topology data identifies all nodes and ports traversed by the selected trunk. For example, the computer 32 can retrieve the logical topology data for the trunk 140, which identifies the nodes AAA-FFF and III and the ports 209, 211, 212, 222, 232, 242, 243, 246, 248, 252, 253 and 254 through which the trunk is routed.

In step 308, the computer 32 retrieves or collects all of the alarms associated with the selected trunk. Since the logical topology data identifies all of the ports traversed by the selected trunk, the computer 32 in step 308 collects all alarms issued by those ports for that one trunk. For example, the computer 32 in step 302 receives the alarms produced by the ports 210, 220, 240 and others for the trunk 142, and the alarms produced by the ports 209, 212, 222, 242, 246, 252 and 254 for the trunk 140. By selecting the trunk 140, the computer 32 in step 308 collects only the alarms issued by the ports on trunk 140, namely the 209, 212, 222, 242, 246, 252 and 254, because these alarms are issued by a port facing the failure on the selected trunk. As can be seen, a certain set of alarms, such as those on trunk 142, are not used in the analysis, thus saving valuable collection and computation time. This provides a great time savings if there are many trunks in failure, with each trunk having many ports issuing alarms.

In an alternative embodiment, the total number of alarms collected could be a set that is fewer than all alarms on the trunk. If the trunk has many alarms, the system may stop after sufficient directional and trunk isolation alarms are collected for fewer than all alarms on a trunk.

In step 310, the computer 32 applies the alarms collected in step 308 to the retrieved topology for the selected trunk. Each alarm is directed to the point of failure because these alarms are issued by a port facing the failure. Therefore the alarms provides information to the computer 32 as to the location of the failure within the network 10 when compared with the topology data for the trunk. For example, the computer 32 applies or correlates the alarms received from the ports 209, 212, 222, 242, 246, 252 and 254 for the trunk 140 to the logical topology data for the trunk 140 to derive directional information. In other words, the computer 32 in step 310 determines a direction of the alarms collected under step 308. If the alarms collected under step 308 inherently include directional information, then step 310 can be omitted under the routine 300. However, the selected alarms and logical topology data for one failed trunk is typically insufficient to isolate the physical location of a failure span which suffers from the failure.

Therefore, in step 312, the computer 32 identifies all failure spans traversed by the selected trunk. The computer 32 preferably retrieves all failure spans generated under the inventor's copending application "Method and Apparatus for Determining Maximum Network Failure Spans for Restoration" for the selected trunk. None of the failure spans overlap each other. As shown in FIG. 3, the trunk 140 spans the nodes AAA-BBB-CCC-DDD-EEE-FFF-III. Comparing this inter-node data of the trunk 140 with the list of failure spans in Table 2, the computer 32 determines that the trunk 140 is associated with the three failure spans FS1, FS2, and FS3.

In step 314, the computer 32 applies the alarms collected under step 308 for the selected trunk to each of the selected failure spans. Then, in step 316, the computer 32 identifies one of the several failure spans identified under step 312 as the failure span containing the failure. The computer 32 under step 316 selects only the one failure span having alarms issued by end nodes of the span, where the alarms are directed to or face each other along that span. Of the three failure spans FS1, FS2, and FS3 identified under step 312, only one of these failure spans satisfies this condition, i.e., failure span FS2 having nodes BBB-CCC-DDD. In other words, the failure span FS2, having end nodes BBB and DDD each issue alarms from the ports 212 and 242 that face each other, respectively.

For the failure span FS1, the node AAA will generate an alarm from the port 209, but the node BBB will not produce an alarm from the port 211 facing the port 209. Therefore, the failure does not occur along the failure span FS1. Likewise, the port 254 for the end node III of the failure span FS3 produces an alarm, but the port 243 of the other end node DDD fails to produce an alarm facing the port 254. Therefore, it can be concluded that the failure similarly does not occur along the failure span FS3. Only the failure span FS2 has end nodes that issue alarms from ports facing toward each other, and thus indicates that the failure is within the span between nodes BBB and DDD.

There is no need to identify whether the failure 250 occurs between the nodes BBB and CCC or between the nodes CCC and DDD in the failure span FS2, because a restoral route between nodes BBB and DDD will compensate for any failure therebetween. In other words, by identifying the failure to within a failure span is the maximum level of analysis or granularity needed to isolate and correct a failure within the network 10. After isolating the failure span containing the failure, the routine 300 ends in step 318.

Under the present invention, a failure span lacks any diverging or terminating trunks so that all trunks that "touch" the failure span fully traverse that failure span. As a result, the present invention can identify the correct failure span having the failure therein based on the analysis of only one trunk and the alarms which issue from a failure in that trunk. After having identified the failure span containing the failure, the computer 32 issues appropriate instructions to restore the identified failure span.

The present invention, however, could also further identify the particular segment or link containing the failure. Under such an alternative embodiment, the computer 32 first identifies pairs of intercoupled nodes in the failure span identified under step 316. The computer 32 determines a pair of nodes within the identified failure span having alarms directed toward each other. Based on this determined pair of nodes, the computer 32 isolates the failure as a link in the network 10 positioned between these two nodes. For example, the computer 32 determines that the ports 212 and 222 of the nodes BBB and CCC in the failure span FS2 produce alarms directed towards each other. As a result, the computer 32 determines that the link 122 contains the failure 250.

In another alternative embodiment to the present invention, the granularity of the analysis performed under the routine 300 by the computer 32 can vary. The present invention has generally been described above as analyzing only high bandwidth DS-3 trunks. However, the granularity of the failure isolation under the routine 300 can be increased. To so increase failure isolation, the granularity of the failure spans must be increased so that the failure spans include lower bandwidth trunks, such as DS-1 trunks, to thereby recognize additional inter-node connections in the network 10. Based on the increased granularity failure spans, the routine 300 can in many circumstances, isolate failures with increased granularity.

In general, the present invention locates failures to within maximum spans of a network that can be singularly restored (i.e., within failure spans). As a result, the present invention can sufficiently isolate a failure using few data points and consequently faster analysis, which minimizes the processing and time required to locate the failure. In other words, the present invention significantly reduces the processing time by reducing the number of trunks analyzed and increasing the length of network segments analyzed when isolating a failure. While prior art methods required analysis of multiple segments of multiple trunks, the present invention allows only a portion of a single trunk extending through a failure span to be analyzed, even though the failure span can include multiple segments and links of multiple trunks.

After identifying a failure within a failure span in the network 10 under the routine 300, the computer 32 can compensate for the failure under a prescribed pre-plan. Each failure span having a failure isolated under the routine 300 will determine what restoration pre-plan is needed for that portion of the network 10. Alternatively, the present invention can be employed to create pre-plans by simulating failures in the network 10. Pre-plans, which result in a 1-to-1 correspondence between each failure in the network 10 and a restoral route, can furthermore be effectively and efficiently generated under the inventor's above-noted copending U.S. patent applications and his copending U.S. patent applications entitled "Method and Apparatus for Identifying Restoral Routes in a Network," "Method and Apparatus for Deriving and Representing Physical Network Topology," and "Method and Apparatus for Isolating Network Failures By Correlating Paths Issuing Alarms With Failure Spans," filed concurrently herewith, and incorporated by reference herein. By maximizing a network span to identify a failure span, the efficiency of restoration pre-plans are maximized, by minimizing the number of pre-plans needed for the network 10.

The failure isolation technique under the routine 300 cannot only be corrected under a pre-plan, but also under dynamic route generation. Under dynamic route generation, the computer 32 dynamically calculates a restoral route after detecting and isolating a failure, rather than generating a pre-plan prior to such a failure. Dynamic route generation is preferably entirely automatic, without human interaction, and thus can be more efficient and timely than current methods for implementing pre-plans.

As noted above, prior art network restoration systems use logical trunk topology to isolate network failures and determine restoral routes. Such prior systems require numerous algorithms to be processed in order to correlate alarms received from the various trunks, based on the equipment and nodes traversed by each trunk, to locate the physical point of failure in the network. Performing these algorithms during the restoration process introduces unnecessary and costly delays. The present invention, conversely, employs failure spans based on physical topology data (i.e node and inter-node links) to determine a maximum network span that can be treated or implemented with a single pre-plan, and thereby expedite the restoration process.

Often, multiple trunks along a link suffer failures, and thus each trunk causes two or more alarms to issue. As noted above, failure spans are defined as being a maximum network span that can be restored with a single restoration route, in terms of two or more nodes and links therebetween. Thus, failure spans cannot include traffic that diverges or terminates therein. In other words, all trunks that are part of a failure span must fully traverse the span. As a result, only one failed trunk and alarms issued therefrom need to be processed under the present invention to identify the failure span of other trunks that traverse the failure span. Consequently, by restoring the failure span, all trunks impacted by the failure will be restored, which provides a significant improvement in processing time over prior methods.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other communications or network systems, not necessarily the exemplary systems described above. For example, while the present invention as been generally described above as being employed in the telecommunications network 10, the present invention is equally applicable to other communication systems, such as a network of computers.

The present invention can employ data based on a trunk of any type and capacity from which the present invention isolates failures within failure spans. Furthermore, while the terms trunk and link are defined above as routing telecommunications traffic, the present invention can analyze and isolate failures within any communication channel or path between nodes and employ any topology data representing such channels or paths, as will be understood by those skilled in the relevant art. Moreover, the term node applies to any point receiving or transmitting signals, not necessarily a DXC system or other telecommunications equipment coupled between two trunks.

While certain operations under the present invention have been described as occurring generally in a serial fashion, those skilled in the relevant art will recognize that it is entirely within the scope of the invention to conduct some operations more or less simultaneously, or even in alternative order, from that described herein. Furthermore, the present invention can be modified to include or employ the systems and concepts of the inventor's copending applications noted above.

These and other changes can be made to the invention in light of the above detailed description. In general, in the following claims, the terms used should not be construed to limit the invention to the specific embodiments disclosed in the specification and the claims, but should be construed to include any network analysis system that operates under the claims. Accordingly, the invention is not limited by the disclosure, but instead its scope is to be determined entirely by the following claims.

I claim:

1. In a telecommunication network having a plurality of nodes interconnected by links, each link having one or more trunks traversing two or more nodes, a computer-implemented method for isolating failures within the network comprising the steps of:

receiving a plurality of alarms from several nodes in the network, each of the alarms indicating a failure impacting one or more trunks within the network and a direction toward the failure;

selecting one of the plurality of alarms corresponding to a selected trunk, the selected trunk being impacted by the failure;

retrieving topology data for the selected trunk, the topology data corresponding to selected nodes traversed by the selected trunk;

collecting a set of alarms from the plurality of alarms, the set of alarms being issued by the selected nodes traversed by the selected trunk;

determining directions of the set of alarms;

identifying one or more maximum restoration spans for failures along one or more links between the selected nodes traversed by the selected trunk, the restoration spans spanning end nodes sandwiching a single route needing restoration if a failure occurs anywhere along the route;

correlating the restoration spans with the directions of the set of alarms;

identifying a failed restoration span containing the failure based on the correlation of the restoration spans with the directions of the set of alarms, wherein the level of granularity of isolating failures is less than or at least equal to the level of granularity necessary to determine a restoral route; and routing network traffic around the failed restoration span.

2. The method of claim 1 wherein the step of correlating the restoration spans with the directions of the set of alarms includes the steps of:

identifying a pair of end nodes for each restoration span; and determining a pair of end nodes from which a pair of alarms are received, wherein the pair of alarms are selected from the set of alarms and have directions directed toward each other, and wherein the step of identifying a failed restoration span containing the failure identifies the failed restoration span as a restoration span having the determined pair of end nodes.

3. The method of claim 1, further comprising the steps of:

identifying pairs of intercoupled nodes for each restoration span;

determining a pair of nodes from which a pair of alarms are received, wherein the pair of alarms are selected from the set of alarms and have directions directed toward each other; and isolating the failure in the network as a failure link positioned between the determined pair of nodes.

4. The method of claim 1 wherein the step of retrieving topology data for the selected trunk includes receiving logical topology data corresponding to the selected nodes and ports at the selected nodes, traversed by the selected trunk.

5. The method of claim 1 wherein the step of receiving a plurality of alarms from several nodes in the network includes receiving alarms for only DS-3 telecommunication links in the network.

6. The method of claim 1, further comprising the step of implementing a network restoration plan based on the identified failed restoration span, wherein the restoration plan includes rerouting instructions for the network to compensate for the failure.

7. The method of claim 1 wherein each node in the network includes a plurality of ports, each port being directed toward a single segment of one of the plurality of trunks, and wherein the step of receiving a plurality of alarms from several nodes in the network includes the step of receiving alarms from all ports directed toward the failure.

8. In a network having a plurality of communication paths coupling a plurality of nodes, each path having one or more channels traversing two or more nodes, a computer-implemented method for isolating a failure within the network, the failure causing a plurality of alarms to be issued, the method comprising the steps of:

selecting a group of alarms from the plurality of alarms, the group of alarms corresponding to a selected channel impacted by the failure, the selected channel traversing selected nodes of the plurality of nodes;

identifying one or more maximum restoration spans for failures along one or more communication paths between the selected nodes traversed by the selected channel, the restoration spans spanning end nodes sandwiching a single route needing restoration if a failure occurs anywhere along the route;

identifying a failed restoration span containing the failure based on a correlation of the restoration spans with the set of alarms, wherein the level of granularity of isolating failures is less than or at least equal to the level of granularity necessary to determine a restoral route;

outputting data of the identified failed restoration span; and routing network traffic around the failed path.

9. The method of claim 8 wherein the step of selecting a group of alarms from the plurality of alarms includes determining directions of the group of alarms toward the failure.

10. The method of claim 8 wherein the step of selecting a group of alarms from the plurality of alarms includes retrieving topology data for the selected channel, the topology data corresponding to selected nodes traversed by the selected channel.

11. The method of claim 8 wherein the network is a telecommunications network, wherein the channels are trunks, and wherein the step of selecting a group of alarms from the plurality of alarms includes receiving a plurality of alarms from several nodes in the network, each of the alarms indicating that the failure impacts one or more trunks within the network and a direction toward the failure.

12. The method of claim 8 wherein the step of identifying a failed restoration span containing the failure includes the steps of:

identifying a pair of end nodes for each restoration span;

determining a pair of end nodes from which a pair of alarms are received, wherein the pair of alarms are selected from the group of alarms and indicate a direction toward each other; and identifying the failed restoration span as a restoration span having the determined pair of end nodes.

13. The method of claim 8, further comprising the steps of:

identifying pairs of intercoupled nodes for each restoration span;

determining a pair of nodes from which a pair of alarms are received, wherein the pair of alarms are selected from the group of alarms and indicate a direction toward each other; and isolating the failure in the network as a selected communication path positioned between the determined pair of nodes.

14. The method of claim 8 wherein the plurality of communication paths in the network include communication paths having greater and lesser bandwidth, and wherein the step of selecting a group of alarms from the plurality of alarms includes selecting alarms for only the paths having the greater bandwidth.

15. The method of claim 8, further comprising the step of implementing a network restoration plan based on the identified failed restoration span.

16. In a network having a plurality of communication paths coupling a plurality of nodes, each path having one or more channels traversing two or more nodes, an apparatus for isolating a failure within the network, the failure causing a plurality of alarms to be issued, the apparatus comprising:

a storage device having stored therein network data for a selected channel impacted by the failure, the network data corresponding to selected nodes traversed by the selected channel; and a computer system coupled to the storage device and coupled to receive the plurality of alarms, the computer system (a) selecting a group of alarms from the plurality of alarms, the group of alarms corresponding to the selected channel, (b) identifying one or more maximum restoration spans for failures along one or more communication paths between the selected nodes traversed by the selected channel, the restoration span comprising end nodes sandwiching a single route needing restoration if a failure occurs anywhere along the route, wherein the level of granularity of isolating failures is less than or equal to the level of granularity necessary to determine a restoral route, (c) identifying a failed restoration span containing the failure based on a correlation of the restoration spans with the set of alarms, and (d) causing the routing of network traffic around the failed restoration span.

17. The apparatus of claim 16 wherein the computer system determines directions of the group of alarms toward the failure.

18. The apparatus of claim 16 wherein the computer system retrieves topology data for the selected channel from the storage device, the topology data corresponding to selected nodes traversed by the selected channel.

19. The apparatus of claim 16 wherein the network is a telecommunications network, wherein the channels are trunks, and wherein the computer system receives a plurality of alarms from several nodes in the network, each of the alarms indicating that the failure impacts one or more trunks within the network and a direction toward the failure.

20. The apparatus of claim 16 wherein the computer system (i) identifies a pair of end nodes for each restoration span; (ii) determines a pair of end nodes from which a pair of alarms are received, wherein the pair of alarms are selected from the group of alarms and indicate a direction toward each other; and (iii) identifies the failed restoration span as a restoration span having the determined pair of end nodes.

21. The apparatus of claim 16 wherein the computer system implements a network restoration plan based on the identified failed restoration span.

22. In a network having a plurality of communication paths coupling a plurality of nodes, each path having one or more channels traversing two or more nodes, an apparatus for isolating a failure within the network, the failure causing a plurality of alarms to be issued, the apparatus comprising:

means for selecting a group of alarms from the plurality of alarms, the group of alarms corresponding to a selected channel impacted by the failure, the selected channel traversing selected nodes of the plurality of nodes;

means, coupled to the means for selecting, for identifying one or more maximum restoration spans for failures along one or more communication paths between the selected nodes traversed by the selected channel, the restoration span comprising end nodes sandwiching a single route needing restoration if a failure occurs anywhere along the route;

means, coupled to the means for identifying, for isolating a failed restoration span containing the failure based on correlation of the restoration spans with the set of alarms, wherein the level of granularity of isolating failures is less than or equal to the level of granularity necessary to determine a restoral route; and means, coupled to the means for isolating, for causing the routing of network traffic around the failed restoration span.

23. The apparatus of claim 22 wherein the means for selecting a group of alarms from the plurality of alarms includes means for determining directions of the group of alarms toward the failure.

24. The apparatus of claim 22 wherein the means for selecting a group of alarms from the plurality of alarms includes the means for retrieving topology data for the selected channel, the topology data corresponding to selected nodes traversed by the selected channel.

25. The apparatus of claim 22 wherein the network is a telecommunications network, wherein the channels are trunks and wherein the means for selecting a group of alarms from the plurality of alarms includes means for receiving a plurality of alarms from several nodes in the network, each of the alarms indicating that the failure impacts one or more trunks within the network and a direction toward the failure.

26. The apparatus of claim 22 wherein the means for identifying a failed restoration span containing the failure includes:

means for identifying a pair of end nodes for each restoration span;

means for determining a pair of end nodes from which a pair of alarms are receive, wherein the pair of alarms are selected from the group of alarms and indicate a direction toward each other; and means for identifying the failed restoration span as a restoration span having the determined pair of end nodes.

27. The apparatus of claim 22, further comprising means for implementing a network rastoration plan based on the identified failed restoration span.

* * * * *